United States Patent
Kim et al.

(10) Patent No.: US 11,071,156 B2
(45) Date of Patent: *Jul. 20, 2021

(54) SIGNAL TRANSMISSION METHOD FOR DEVICE-TO-DEVICE (D2D) COMMUNICATION IN WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Hanbyul Seo, Seoul (KR); Inkwon Seo, Seoul (KR); Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 16/458,661

(22) Filed: Jul. 1, 2019

(65) Prior Publication Data

US 2019/0327773 A1    Oct. 24, 2019

Related U.S. Application Data

(63) Continuation of application No. 15/323,069, filed as application No. PCT/KR2015/006983 on Jul. 7, 2015, now Pat. No. 10,375,746.

(Continued)

(51) Int. Cl.
*H04W 76/14* (2018.01)
*H04W 72/04* (2009.01)

(Continued)

(52) U.S. Cl.
CPC .......... *H04W 76/14* (2018.02); *H04L 5/0048* (2013.01); *H04W 72/04* (2013.01); *H04W 72/12* (2013.01); *H04W 72/1278* (2013.01)

(58) Field of Classification Search
CPC . H04W 76/14; H04W 72/1278; H04W 72/04; H04W 72/12; H04L 5/0048
See application file for complete search history.

(56) References Cited

U.S. PATENT DOCUMENTS

| 2013/0059583 A1 | 3/2013 | Van Phan et al. |
| 2013/0142268 A1 | 6/2013 | Gao et al. |

(Continued)

FOREIGN PATENT DOCUMENTS

| CN | 103209487 | 7/2013 |
| CN | 103686985 | 3/2014 |

(Continued)

OTHER PUBLICATIONS

Novlan et al., U.S. Appl. No. 61/968,886 "Methods and apparatus for device-to-device broadcast", filed Mar. 21, 2014 (Year: 2014).*

(Continued)

*Primary Examiner* — Justin T Van Roie
(74) *Attorney, Agent, or Firm* — Lee, Hong, Degerman, Kang & Waimey

(57) ABSTRACT

The present invention relates to a method and an apparatus for D2D signal transmission of a first terminal in a wireless communication system. Specifically, the method comprises the steps of: receiving a resource pool configuration indicating a D2D resource pool; and transmitting a D2D data channel on the basis of a D2D slot number which is re-indexed within the D2D resource pool.

14 Claims, 9 Drawing Sheets

(a) Control-plane protocol stack (b) User-plane protocol stack

Related U.S. Application Data

(60) Provisional application No. 62/038,848, filed on Aug. 19, 2014, provisional application No. 62/027,778, filed on Jul. 22, 2014, provisional application No. 62/024,998, filed on Jul. 15, 2014, provisional application No. 62/021,231, filed on Jul. 7, 2014.

(51) Int. Cl.
*H04W 72/12* (2009.01)
*H04L 5/00* (2006.01)

(56) References Cited

U.S. PATENT DOCUMENTS

| | | |
|---|---|---|
| 2013/0225184 A1 | 8/2013 | Liu et al. |
| 2013/0315212 A1 | 11/2013 | Sorrentino |
| 2014/0094183 A1 | 4/2014 | Gao et al. |
| 2014/0177542 A1 | 6/2014 | Novak et al. |
| 2014/0328329 A1 | 11/2014 | Novlan et al. |
| 2015/0327315 A1 | 11/2015 | Xue et al. |
| 2017/0171897 A1 | 6/2017 | Ryu et al. |
| 2018/0176973 A1 | 6/2018 | Kim et al. |

FOREIGN PATENT DOCUMENTS

| | | |
|---|---|---|
| CN | 103906266 | 7/2014 |
| EP | 3169128 | 5/2017 |
| JP | 2016537850 | 12/2016 |
| KR | 1020140040003 | 4/2014 |
| KR | 1020140055981 | 5/2014 |
| WO | 2015141848 | 9/2015 |

OTHER PUBLICATIONS

PCT International Application No. PCT/KR2015/006983, Written Opinion of the International Searching Authority dated Nov. 13, 2015, 18 pages.
LG Electronics, "Resource allocation Mode 2 in D2D communication", R1-142148, 3GPP TSG RAN WG1 Meeting #77, May 2014, 6 pages.
LG Electronics, "On the D2D-related information sharing between in-coverage UEs and out-coverage UEs", R1-142158, 3GPP TSG RAN WG1 Meeting #77, May 2014, 5 pages.
European Patent Office Application Serial No. 19156551.4, Search Report dated May 21, 2019, 7 pages.
State Intellectual Property Office of the People's Republic of China Application Serial No. 201580037002.0, Office Action dated Nov. 27, 2018, 9 pages.
U.S. Appl. No. 15/323,069, Notice of Allowance dated Mar. 20, 2019, 15 pages.
U.S. Appl. No. 15/323,069, Office Action dated Jul. 3, 2018, 21 pages.
European Patent Office Application Serial No. 15819195.7, Search Report dated Feb. 7, 2018, 6 pages.
Intel, "Resource allocation for D2D communication", 3GPP TSG RAN WG2 Meeting #85, R2-140312, XP050791705, Feb. 2014, 5 pages.
Ericsson, "Resource allocation for ProSe Direct Discovery", 3GPP TSG RAN WG2 Meeting #86, R2-142407, XP050793558, May 2014, 6 pages.
Samsung, "D2D synchronization procedure for resource pool configuration", 3GPP TSG RAN WG1 Meeting #77, R1-142119, May 2014, 5 pages.
Samsung, "Details on scrambling sequence generation", 3GPP TSG RAN WG1 Meeting #77, May 2014, R1-142105, May 2014, 2 pages.
3rd Generation Partnership Project (3GPP), "Technical Specification Group Radio Access Network; Evolved Universal Terrestrial Radio Access (E-UTRA); Physical channels and modulation (Release 11)," 3GPP TS 36.211 V11.5.0, Dec. 2013, 6 pages.
QUALCOMM, "Signaling Details for ProSe Direct Discovery", 3GPP TSG RAN WG2 Meeting #86, R2-142540, May 2014, 7 pages.
Alcatel-Lucent, et al., "Resource allocation for scheduling assignment", 3GPP TSG RAN WG1 Meeting #77, R1-142574, May 2014, 6 pages.
Zte, "Resource Allocation for Type 1 Discovery", 3GPP TSG RAN WG1 Meeting #76bis, R1-142231, May 2014, 5 pages.
Kyocera, "D2D communication resource allocation using Scheduling Assignments", R1-140664, 3GPP TSG RAN WG1 Meeting #76, Feb. 2014, 3 pages.

* cited by examiner (a) Control-plane protocol stack (b) User-plane protocol stack

SIGNAL TRANSMISSION METHOD FOR DEVICE-TO-DEVICE (D2D) COMMUNICATION IN WIRELESS COMMUNICATION SYSTEM, AND APPARATUS THEREFOR

CROSS-REFERENCE TO RELATED APPLICATIONS

This application is a continuation of U.S. patent application Ser. No. 15/323,069, filed on Dec. 29, 2016, now U.S. Pat. No. 10,375,746, which is the National Stage filing under 35 U.S.C. 371 of International Application No. PCT/KR2015/006983, filed on Jul. 7, 2015, which claims the benefit of U.S. Provisional Application No. 62/021,231, filed on Jul. 7, 2014, 62/024,998, filed on Jul. 15, 2014, 62/027,778, filed on Jul. 22, 2014 and 62/038,848, filed on Aug. 19, 2014, the contents of which are all hereby incorporated by reference herein in their entirety.

TECHNICAL FIELD

The present invention relates to a wireless communication system and, more specifically, to a signal transmission method for device-to-device (D2D) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and basic standardization thereof is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist per base station. One cell is set to one of bandwidths of 1.44, 3, 5, 10, 15 and 20 MHz to provide a downlink or uplink transport service to several UEs. Different cells may be set to provide different bandwidths. Additionally, one base station controls data transmission and reception for a plurality of UEs. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding UE of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has evolved into LTE, request and expectation of users and providers have continued to increase. Also, since another wireless access technology is being continuously developed, new evolution of wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a signal transmission method for device-to-device (D2D) communication in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of transmitting a device-to-device device (D2D) signal of a first terminal in a wireless communication system includes: receiving a resource pool configuration indicating a D2D resource pool; and transmitting a D2D data channel on the basis of a D2D slot number re-indexed within the D2D resource pool.

The D2D data channel may have been scrambled using a scrambling sequence generated on the basis of the re-indexed D2D slot number.

The D2D data channel may include a demodulation reference signal (DMRS), wherein a base sequence of the DMRS is generated on the basis of the re-indexed D2D slot number.

The D2D data channel may have been scrambled using a scrambling sequence generated on the basis of a D2D slot number re-indexed according to only uplink subframes within the D2D resource pool.

The D2D data channel may include a DMRS, wherein a base sequence of the DMRS is generated on the basis of a D2D slot number re-indexed according to only uplink subframes within the D2D resource pool.

The D2D slot number may be re-indexed using a modulo operation.

The D2D resource pool may include a scheduling assignment resource pool and a D2D data channel resource pool, wherein the scheduling assignment resource pool is configured to precede the D2D data channel resource pool.

The first terminal and a second terminal may be respectively synchronized with different serving cells.

The method may further include receiving, from a first serving cell with which the first terminal is synchronized, slot index offset information of the first serving cell and a second serving cell with which the second terminal is synchronized.

In another aspect of the present invention, a first terminal transmitting a D2D signal in a wireless communication system includes: a radio frequency unit; and a processor, wherein the processor is configured to receive a resource pool configuration indicating a D2D resource pool and to transmit a D2D data channel on the basis of a D2D slot number re-indexed within the D2D resource pool.

Advantageous Effects

According to embodiments of the present invention, signals for D2D communication can be efficiently transmitted in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

The configuration, operation and other features of the present invention will be easily understood according to the following embodiments of the present invention described with reference to the attached drawings. The following embodiments are examples in which technical features of the present invention are applied to a 3GPP system.

Although embodiments of the present invention will be described using LTE and LTE-A, LTE and LTE-A are exemplary and embodiments of the present invention can be applied to any communication system corresponding to the above definition. In addition, while embodiments of the present invention are described based on FDD in the specification, FDD is exemplary and embodiments of the present invention can be easily modified and applied to H-FDD or TDD.

Figure 1:
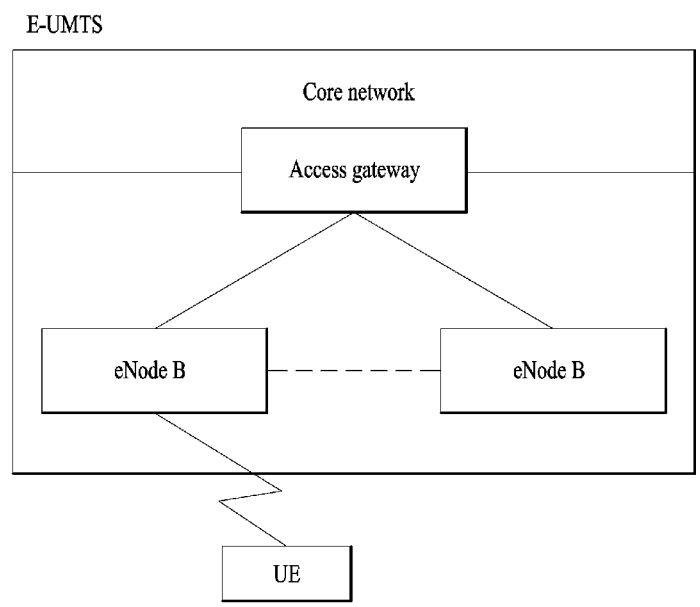
FIG. 1 illustrates a network structure of an E-UMTS as an example of a wireless communication system.
Figure 2:
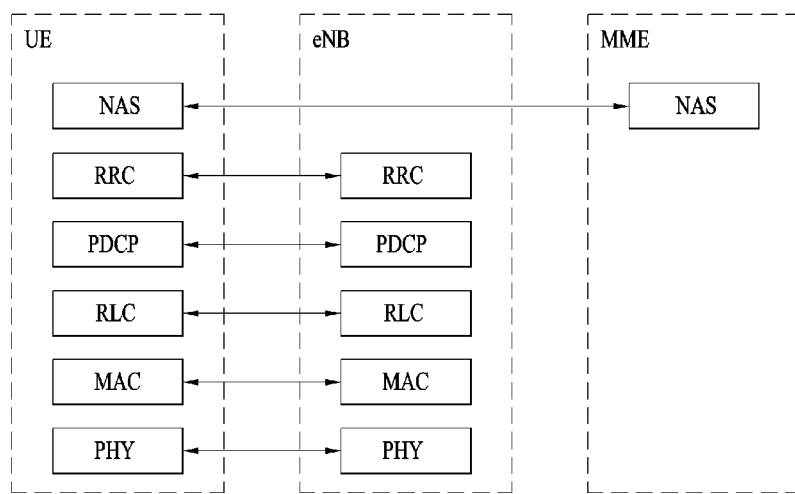
FIG. 2 illustrates structures of a control plane and a user plane of a radio interface protocol between a UE and E-UTRAN based on the 3GPP radio access network standard.
Figure 2:
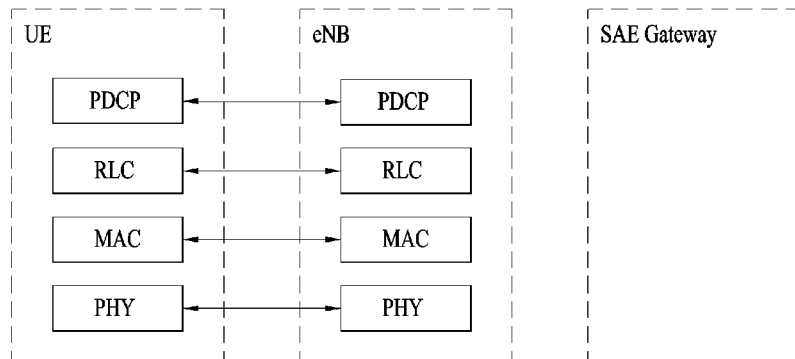

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
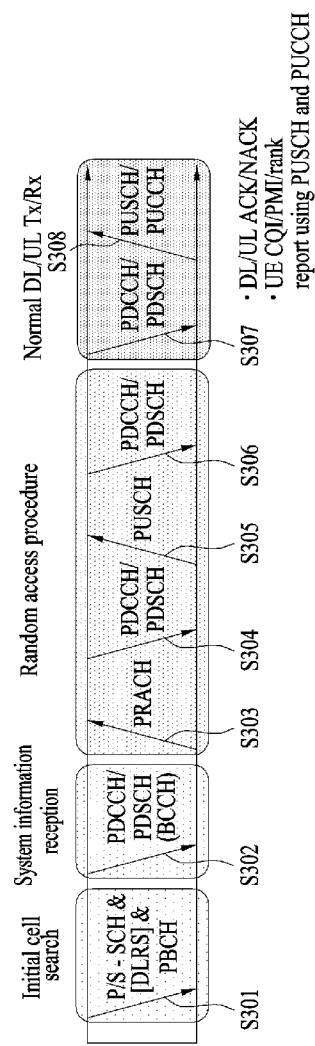
FIG. 3 illustrates physical channels used in a 3GPP LTE system and a general method for transmitting a signal using the physical channels.

FIG. 3 illustrates physical channels used in a 3GPP system and a general method for transmitting a signal using the physical channels.

A user equipment (UE) performs initial cell search such as synchronizing with a base station when it newly enters a cell or the power is turned on (S301). To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH (S302).

The UE may perform a random access procedure (RACH) to complete access to the base station when the UE initially accesses the BS or has no radio resources for signal transmission (S303 to S306). To this end, the UE may transmit a specific sequence through a preamble over a physical random access channel (PRACH) (S303 and S305) and may receive a response message to the preamble through the PDCCH and the PDSCH corresponding to the PDCCH (S304 and S306). In the case of a contention based RACH, the UE may additionally perform a contention resolution procedure.

Having performed the above described procedures, the UE may be able to perform a PDCCH/PDSCH reception (S307) and a PUSCH/PUCCH (physical uplink shared channel/physical uplink control channel) transmission (S308) as a general uplink/downlink signal transmission procedure. Particularly, the UE receives downlink control information (DCI) through the PDCCH. Here, DCI includes control information such as resource allocation information about the UE and has a format depending on purpose of use.

Control information transmitted from the UE to the base station on uplink or transmitted from the base station to the UE includes a downlink/uplink ACK/NACK signal, a channel quality indicator (CQI), a precoding matrix index (PMI), a rank indicator (RI), etc. In 3GPP LTE, the UE can transmit the control information such as CQI/PMI/RI through a PUSCH and/or a PUCCH.

Figure 4:
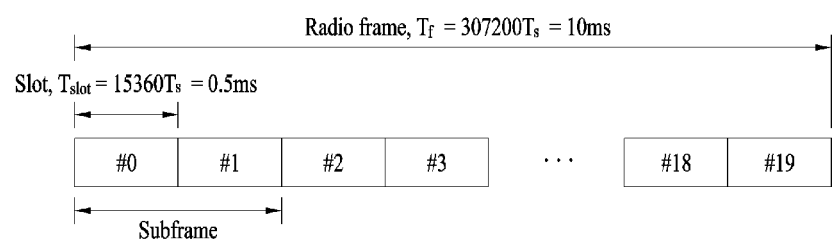
FIG. 4 illustrates a structure of a radio frame used in an LTE system.

FIG. 4 illustrates a structure of a radio frame used in LTE.

Referring to FIG. 4, the radio frame has a length of 10 ms (327,200×Ts) and includes 10 subframes equal in size. Each subframe is 1 ms in length and is composed of two slots each having a length of 0.5 ms (15,360×Ts). Here, Ts denotes sampling time and is represented as Ts=1/(15 kHz×2,048)= $3.2552 \times 10^{-8}$ (about 33 ns). A slot includes a plurality of OFDM symbols in the time domain and includes a plurality of resource blocks (RBs) in the frequency domain. In LTE, a single RB includes 12 subcarrier×7(6) OFDM symbols. A transmission time interval (TTI), a unit time for data transmission, can be defined as one or more subframes. The radio frame structure is merely exemplary and the number of subframes included in the radio frame, the number of slots included in a subframe, and the number of symbols included in a slot can vary.

Figure 5:
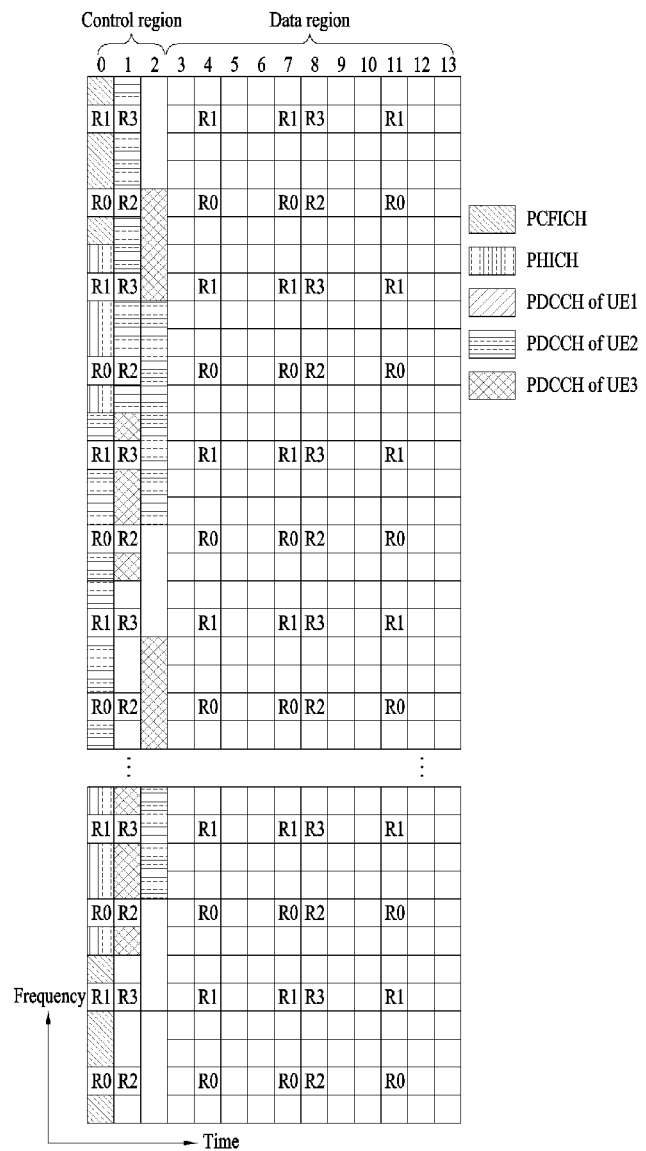
FIG. 5 illustrates a structure of a downlink radio frame used in an LTE system.

FIG. 5 illustrates control channels included in a control region of a subframe in a downlink radio frame.

Referring to FIG. 5, the subframe includes 14 OFDM symbols. One to three OFMD symbols located in the front portion of the subframe are used as a control region and the remaining OFDM symbols are used as a data region depending on subframe configuration. In the figure, R1 to R4 denote a reference signal (RS) (or pilot signal) for antennas #0 to #3. The RS is fixed in a specific pattern in the subframe irrespective of the control region and the data region. Control channels are allocated to resources to which the RS is not assigned in the control region and traffic channels are allocated to resources to which the RS is not assigned in the data region. Control channels allocated to the control region include a PCFICH (Physical Control Format Indicator Channel), a PHICH (Physical Hybrid-ARQ Indicator Channel), a PDCCH (Physical Downlink Control Channel), etc.

The PCFICH is a physical control format indicator channel and notifies a UE of the number of OFDM symbols used for a PDCCH per subframe. The PCFICH is located at the first OFDM symbol and configured prior to a PHICH and a PDCCH. The PCFICH is composed of 4 resource element groups (REGs) which are distributed in the control region on the basis of a cell ID (cell identity). A single REG is composed of 4 resource elements (REs). An RE refers to a minimum physical resource defined as one subframe×one OFDM symbol. The PCFICH indicates values of 1 to 3 or 2 to 4 depending on bandwidth and is modulated through QPSK (Quadrature Phase Shift Keying).

The PHICH is a physical HARQ (Hybrid—Automatic Repeat and request) indicator channel and is used to carry HARQ ACK/NACK for uplink transmission. That is, the PHICH refers to a channel through which DL ACK/NACK information for UL HARQ is transmitted. The PHICH includes a single REG and is cell-specifically scrambled. ACK/NACK is indicated by 1 bit and is modulated through BPSK (Binary phase shift keying). The modulated ACK/NACK is spread using a spreading factor (SF) or 2 or 4. A plurality of PHICHs mapped to the same resource constitutes a PHICH group. The number of PHICHs multiplexed to the PHICH group is determined by the number of spreading codes. The PHICH (group) is repeated three times in order to obtain a diversity gain in the frequency domain and/or the time domain.

The PDCCH is a physical downlink control channel and is allocated to first n OFDM symbols of the subframe. Here, n is an integer greater than or equal to 1 and is indicated by the PCFICH. The PDCCH is composed of one or more CCEs. The PDCCH notifies each UE or UE group of information related to resource allocation of a PCH (paging channel) and a DL-SCH (downlink-shared channel) which are transport channels, an uplink scheduling grant), HARQ information and the like. The PCH and DL-SCH are transmitted over a PDSCH. Accordingly, a base station and a UE transmit and receive data through the PDSCH except specific control information or specific service data.

Information about a UE (one or more UEs) to which PDSCH data will be transmitted and how the UE receives and decodes the PDSCH data is transmitted in a PDCCH. For example, if a specific PDCCH is CRC-masked with RNTI (Radio Network Temporary Identity) "A", and information about data transmitted using a radio resource "B" (e.g., frequency position) and a DCI format "C", that is, transmission format information (e.g., transport block size, modulation scheme, coding information, etc.) is transmitted through a specific subframe, a UE within a cell monitors the PDCCH using RNTI information thereof. If one or more UEs have RNTI "A", the UEs receive the PDCCH and receive a PDSCH indicated by "B" and "C" through information of the received PDCCH.

Figure 6:
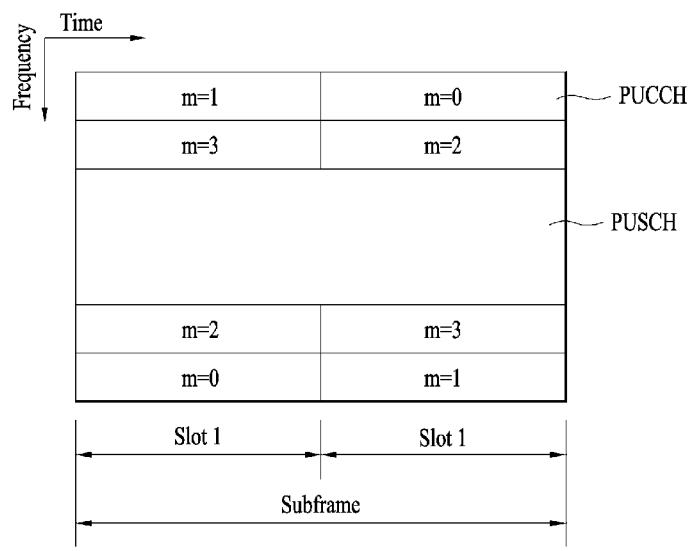
FIG. 6 illustrates a structure of an uplink radio frame used in an LTE system.

FIG. 6 illustrates a structure of an uplink subframe used in LTE.

Referring to FIG. 6, the uplink subframe can be divided into a region to which a PUCCH (Physical Uplink Control Channel) carrying control information is allocated and a region to which a PUSCH (Physical Uplink Shared Channel) carrying user data is allocated. The middle part of the subframe is assigned to the PUSCH and both sides of the data region in the frequency domain are assigned to the PUCCH. Control information transmitted over the PUCCH includes HARQ ACK/NACK, a CQI (Channel Quality Indicator) indicating a downlink channel state, an RI (Rank Indicator) for MIMO, an SR (Scheduling Request) that is an uplink resource allocation request. The PUCCH for one UE uses a single resource block that occupies different frequencies in each slot in the subframe. That is, 2 resource blocks allocated to the PUCCH are frequency hopped at the slot boundary. Particularly, FIG. 6 illustrates allocation of a PUCCH corresponding to m=0, a PUCCH corresponding to m=1, a PUCCH corresponding to m=2 and a PUCCH corresponding to m=3 to a subframe.

A description will be given of a MIMO system. MIMO (Multiple-Input Multiple-Output) is a method of using a plurality of transmit antennas and a plurality of receive antennas to improve data transmission/reception efficiency. That is, a transmitter or a receiver of a wireless communication system can increase capacity and improve performance using a plurality of antennas through MIMO. In the specification, MIMO can be referred to as "multiple antennas".

In multi-antenna technology, a whole message is not received through a single antenna path. The multi-antenna technology aggregates data fragments received through multiple antennas to accomplish data. The multi-antenna technology can increase a data transfer rate in a cell area having a specific size or improve system coverage while securing a specific data transfer rate. Furthermore, the multi-antenna technology can be widely used for mobile communication terminals, relays and the like. According to the multi-antenna technology, it is possible to overcome traffic limitation in mobile communication using a single antenna.

Figure 7:
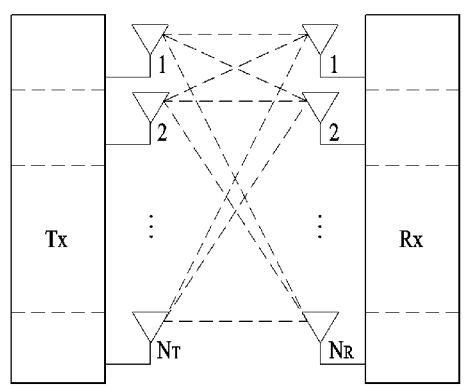
FIG. 7 illustrates a configuration of a general MIMO communication system.

FIG. 7 illustrates a configuration of a general MIMO communication system. NT transmit (Tx) antennas are provided to a transmitter and NR receive (Rx) antennas are provided to a receiver. When both the transmitter and the receiver use a plurality of antennas in this manner, a theoretical channel transmission capacity is increased, compared to use of a plurality of antennas at only one of the transmitter and the receiver. A channel transmission capacity increases in proportion to the number of antennas. Therefore, a transmission rate and frequency efficiency are improved. When a maximum transmission rate when a single antenna is used is Ro, a transmission rate when multiple antennas are used may increase, in theory, to the product of the maximum transmission rate Ro and a transmission rate increase rate Ri as represented by Equation 1.

$$R_i = \min(N_T, N_R) \quad \text{[Equation 1]}$$

For example, a MIMO communication system using 4 Tx antennas and 4 Rx antennas may achieve a four-fold increase in transmission rate theoretically, relative to a single-antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched, for example, research into information theory associated with MIMO communication capacity under various channel environments or multiple access environments, research into a radio frequency channel measurement and modeling of the MIMO system, and research into a space-time signal processing technology for transmission reliability and transmission rate improvement.

Mathematical modeling of a communication method for use in the MIMO system will hereinafter be described in detail. It is assumed that there are NT Tx antennas and NR Rx antennas, as illustrated in FIG. 7. In the case of a transmission signal, a maximum number of transmission information pieces is NT under the condition that NT Tx antennas are used. The transmission information can be represented by a vector as expressed by Equation 2.

$$s = [s_1, s_2, \ldots, s_{N_T}]^T \quad \text{[Equation 2]}$$

Individual transmission information pieces $s_1, s_2, \ldots, s_{N_T}$ may have different transmission powers. In this case, if the individual transmission powers are denoted by $P_1, P_2, \ldots, P_{N_T}$, then transmission information having an adjusted transmission power can be represented by a vector as expressed by Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Ŝ can be represented by the following equation 4 using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a case in which a weight matrix W is applied to ŝ having an adjusted transmission power so that NT transmitted signals signal $x_1, x_2, \ldots, x_{N_T}$ are configured is considered. In this case, the weight matrix W is adapted to properly distribute transmission information to individual antennas according to transmission channel situations. The above-mentioned transmitted signals signal $x_1, x_2, \ldots, x_{N_T}$ can be represented by the following equation 5 using the vector X. Here, $w_{ij}$ denotes a weight corresponding to i-th Tx antenna and j-th information. W represents a weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In general, the physical meaning of the rank of a channel matrix can be regarded as a maximum number of different pieces of information that can be transmitted over a given channel. Accordingly, the channel matrix rank is defined by a minimum number between the number of rows and the number of columns, in which the rows and the columns are independent of each other. Therefore, the channel matrix rank cannot be higher than the number of rows or columns. For example, the rank of a channel matrix H is represented by the following equation 6.

$$\text{rank}(H) \leq \min(N_T, N_R)$$ [Equation 6]

Different pieces of information transmitted using MIMO are defined as "transmitted streams" or simply "streams". "Stream" may also be called "layer". The number of streams cannot be greater than the channel rank corresponding to a maximum number of different pieces of information that can be transmitted over a channel. Therefore, the channel matrix H can be represented by the following equation 7.

$$\text{\# of streams} \leq \text{rank}(H) \leq \min(N_T, N_R)$$ [Equation 7]

Here, "# of streams" denotes the number of streams. It is noted that one stream can be transmitted through one or more antennas.

There may be various methods for matching one or more streams to multiple antennas. Such methods can be described as follows according to type of multi-antenna technology. Transmission of one stream through multiple antennas can be regarded as spatial diversity and transmission of multiple streams through multiple antennas can be regarded as spatial multiplexing. A hybrid scheme of spatial diversity and spatial multiplexing is possible.

Figure 8:
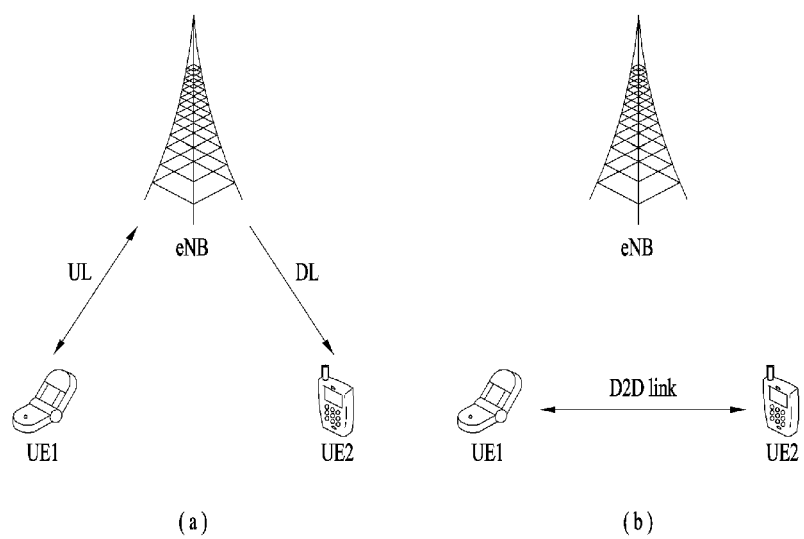
FIG. 8 illustrates the concept of D2D communication.

FIG. 8 illustrates the concept of D2D communication. FIG. 8(a) illustrates an eNB-centralized communication system in which a first UE UE1 transmits data to an eNB on uplink and the eNB transmits the data from the first UE UE1 to a second UE UE2 on downlink.

FIG. 8(b) illustrates a UE-to-UE communication system as an example of D2D communication in which data can be exchanged between UEs without passing through an eNB. A link directly established between devices may be referred to as a D2D link. D2D communication has the advantages of reduced latency and requiring less radio resources compared to eNB-centralized communication.

While D2D communication supports communication between devices (or UEs) without an eNB, D2D communication reuses resources of legacy wireless communication systems (e.g., 3GPP LTE/LTE-A) and thus does not interfere with or disturb legacy wireless communication systems. In the same context, it is important to minimize interference applied to D2D communication by UEs, eNBs and the like operating in legacy wireless communication systems.

A description will be given of a method of efficiently transmitting a scrambling sequence and a demodulation-reference signal (DMRS) in D2D communication according to the present invention on the basis of the above description.

D2D communication to which the present invention is applied is described with reference to FIG. 8(b). While UEs are user terminals in FIG. 8(b) for convenience of description, network equipment such as an eNB may be regarded as a UE to which the present invention is applicable when eNBs transmit and receive signals according to UE-to-UE communication.

Referring to FIG. 8(b), UE1 may operate to select a resource unit corresponding to specific resources in a resource pool that refers to a set of contiguous resources and transmit a D2D signal using the resource unit. Accordingly, a reception UE (i.e., UE2) can detect the signal from UE1 within a resource pool configured for UE2 in which UE1 can transmit signals. Here, the resource pool may be i) notified by an eNB when the eNB is in coverage or ii) notified by another UE or determined as predetermined resources when the eNB is out of coverage. In general, a resource pool is composed of a plurality of resource units, and each UE can select one or more resource units and use the selected resource units for D2D signal transmission.

Figure 9:
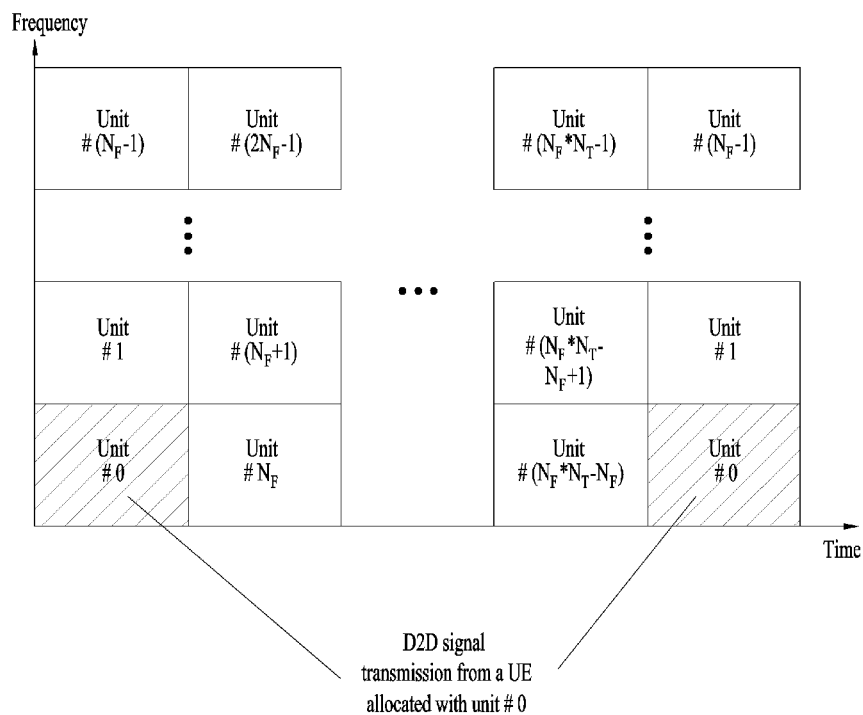
FIG. 9 is a reference diagram illustrating a resource pool for D2D communication according to the present invention.

FIG. 9 is a reference diagram illustrating an embodiment of resource unit configuration. FIG. 9 illustrates a case in which whole frequency resources are divided into $N_F$ resource units and whole time resources are divided into $N_T$ resource units to configure a total of $N_F * N_T$ resource units. Here, the resource pool can be considered to be repeated at intervals of an $N_T$ subframe period. A single resource unit may be periodically repeated, as shown in FIG. 9. Furthermore, to obtain diversity effects in time/frequency domains, an index of a physical resource unit mapped to a logical resource unit may be changed in a predetermined pattern with time. In the resource unit structure/format as illustrated in FIG. 9, the resource pool may refer to a set of resource units that can be used for a UE to transmit a D2D signal.

In addition, the resource pool may be divided into various types. The resource pool can be divided according to content of a D2D signal transmitted therein. For example, content of a D2D signal can be classified as follows and a separate resource pool can be configured for each piece of content.

Scheduling assignment (SA): this can be classified as a signal including information such as the position of resources used for each transmission UE to transmit a following D2D data channel, a modulation and coding scheme (MCS) required for data channel demodulation and a MIMO transmission scheme. The SA signal may be multiplexed and transmitted with D2D data in the same resource unit. In this case, an SA resource pool may refer to a resource pool in which SA is multiplexed and transmitted with D2D data.

D2D data channel this can be classified as a resource pool used for a transmission UE to transmit user data using resources designated through SA. If SA information can be multiplexed and transmitted with D2D data in the same resource unit, only a D2D data channel other than the SA information can be transmitted in the resource pool for the D2D data channel. In other words, a resource element used to transmit SA information in an individual resource unit within the SA resource pool can be used to transmit D2D data in the D2D data channel resource pool.

Discovery message: this can be classified as a resource pool for a message through which a transmission UE transmits information such as the ID thereof such that a neighboring UE can discover the transmission UE.

Even when D2D signals have different pieces of content, different resource pools can be used for the D2D signals according to transmission and reception properties of the D2D signals. For example, even in the case of identical D2D data channels or discovery messages, the D2D data channels or discovery messages may be classified as different resource pools according to i) a D2D signal transmission timing determination method (e.g., whether a D2D signal is transmitted at synchronization reference signal reception timing or transmitted with a predetermined timing advance at the synchronization reference signal reception timing), ii) a resource allocation method (e.g., whether transmission resources of an individual signal are designated by an eNB for an individual transmission UE or selected by the individual transmission UE within a resource pool) or iii) a signal format (e.g., the number of symbols occupied by each D2D signal in a single subframe or the number of subframes used to transmit a single D2D signal).

That is, a UE that intends to transmit data through D2D communication selects appropriate resources from the SA resource pool and transmits an SA thereof. Here, SA resources associated with at least one of i) resources through which SAs of other UEs are not transmitted and ii) resources expected not to have data transmission in following subframes according to SAs of other UEs can be preferentially selected. Additionally, the UE may select SA resources associated with data transmission resources expected to have a low reference level.

Figure 10:
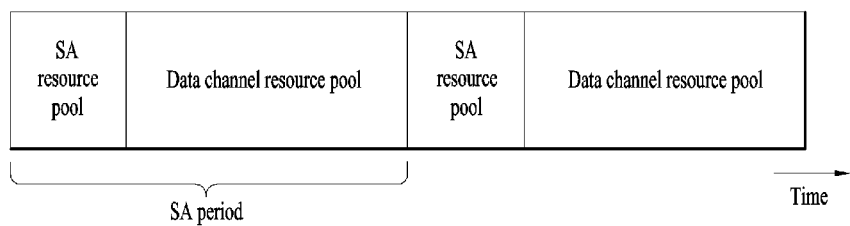
FIG. 10 is a reference diagram illustrating a scheduling assignment (SA) period according to the present invention.

FIG. 10 illustrates a case in which an SA resource pool and a D2D data channel resource pool according to the present invention are periodically repeated. As illustrated in FIG. 10, the SA resource pool precedes the D2D data channel resource pool, in general. A reception UE attempts to detect an SA first and then attempts to receive desired data in associated data resources upon discovery of presence of the data. The period in which the SA resource pool appears in the periodic arrangement of the SA resource pool and the following D2D data channel resource pool as illustrated in FIG. 10 is referred to as an SA period in the present invention.

A description will be given of D2D communication between neighboring cells.

D2D communication can be performed between neighboring cells. D2D communication between neighboring cells may refer to D2D communication between UEs having different serving cells. Here, neighboring cells may be synchronized with each other or have different synchronizations.

For example, when subframes of cell 1 are sequentially indexed as 0, 1, 2, 3, . . . , and cell 2 has synchronization delayed from the subframe indices of cell 1 by 3 subframes, the subframe index of cell 2 may be 0 when the subframe index of cell 1 is 3. In other words, when cell 1 has subframe indices 3, 4, 5, 6, . . . , cell 2 may have subframe indices 0, 1, 2, 3, . . . . Here, when subframe indices are used to generate a scrambling sequence and a DMRS, reception UEs need to check the scrambling sequence and DMRS for multiple subframe indices for D2D between neighboring cells. In this process, system performance may be deteriorated.

The present invention proposes use of subframe index offset information (e.g., offset term) between cells when the scrambling sequence and the DMRS are generated in a D2D environment to solve the problem with respect to the DMRS and scrambling sequence, which may be generated when cells are not synchronized as described above.

First Scheme

According to a first scheme of the present invention, cells may announce synchronization therebetween to each other and to transmission/reception UEs as follows.

Scheme 1-A. Cells announce synchronization information to each other. For example, cells can announce a start point of D2D subframe indices or a broadcast channel (BCH) to each other for synchronization information.

Scheme 1-B. Each cell can determine a reference cell for a subframe index on the basis of synchronization acquired through 1-A. (Here, a cell may determine itself as a reference cell and use a subframe index thereof as the subframe index.).

Scheme 1-C. Each cell notifies transmission/reception UEs of information about the reference cell through RRC signaling when the corresponding cell is not the reference cell. Here, a cell can announce, to the transmission/reception UEs, i) a subframe index offset term or ii) a slot index offset term between the cell and the reference cell, which will be used for a scrambling sequence and a DMRS.

Alternatively, a new subframe index (or slot index) may be generated and used instead of a subframe index of a specific cell (i.e. re-indexing). Here, a difference between the new subframe index and a subframe index of a corresponding cell may be calculated and announced as offset information to the transmission/reception UEs when offset information (e.g., offset term) is announced to the transmission/reception UEs in scheme 1-C. Otherwise, a difference between a new slot index and a slot index of the corresponding cell may be calculated and announced as offset information to the transmission/reception UEs.

Figure 11:
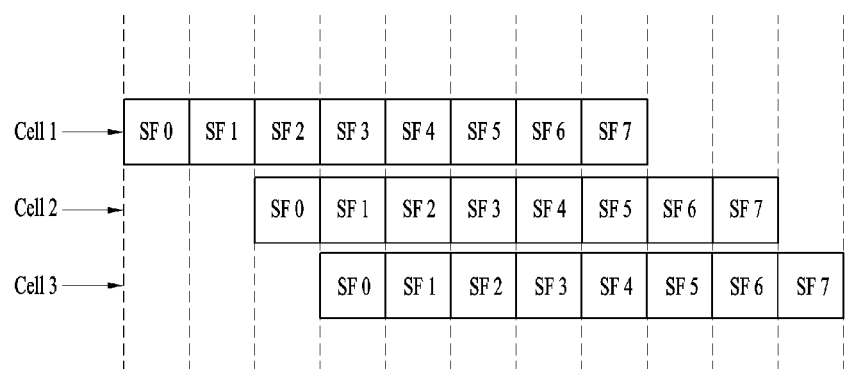
FIG. 11 is a reference diagram illustrating cells having different subframe synchronizations.

FIG. 11 is a reference diagram illustrating the first scheme of the present invention.

Application examples of the present invention will be described on the assumption that cell 1, cell 2 and cell 3 have different subframe synchronizations as illustrated in FIG. 11. In FIG. 11, subframe index 3 of cell 1 corresponds to subframe index 1 of cell 2 and subframe index 0 of cell 3. It is assumed that cell 2 and cell 3 determine cell 1 as a reference cell according to the present invention.

In this case, cell 2 has a subframe index offset of "2" with respect to cell 1 and cell 3 has a subframe index offset of "3" with respect to cell 1. If the cells announce a subframe index difference between cell 1, cell 2 announces the subframe offset value "2" to D2D UEs belonging to cell 2 using RRC signaling. Similarly, cell 3 can announce the subframe offset value "3" to D2D UEs belonging to cell 3 using RRC signaling. Here, a D2D transmission UE in cell 2 uses a subframe index obtained by adding the offset value "2" to a subframe index of the serving cell thereof for generation of a scrambling sequence and a DMRS. A D2D reception UE in cell 3 can perform detection on the assumption that a subframe index obtained by adding the offset value "3" to a subframe index of the serving cell thereof has been used for generation of the scrambling sequence and the DMRS.

A description will be given of a method of generating a D2D scrambling sequence according to the first scheme of the present invention in detail. The initial value of the scrambling sequence of the PUSCH in the current LTE standards has been defined as represented by Equation 8.

$$c_{init} = n_{RNTI} \cdot 2^{14} + q \cdot 2^{13} + \lfloor n_s/2 \rfloor \cdot 2^9 + N_{ID}^{cell} \qquad \text{[Equation 8]}$$

In Equation 8, $n_{RNTI}$ is a value received through higher layer signaling, q is the number of codewords, $\lfloor n_s/2 \rfloor$ denotes a subframe index of data and $N_{ID}^{cell}$ is a cell ID.

In the first scheme of the present invention, Equation 8 can be modified according to rules A-1 to A-6 described below and used to determine the initial value of the D2D data scrambling sequence.

A-1: $\lfloor n_s/2 \rfloor$ can be replaced by a subframe index of another cell or a newly generated subframe index (e.g., re-indexed subframe index) in Equation 8. Here, $n_s$ may be a slot index in the resource pool of each cell.

A-2: $n_s$ can be replaced by a slot index of another cell or a newly generated slot index (e.g., re-indexed slot index) in Equation 8. Here, $n_s$ may be a slot index in the resource pool of each cell.

A-3: $\lfloor n_s/2 \rfloor$ can be replaced by $\lfloor n_s 2 \rfloor + \text{offset}_{SF}$ in Equation 8. Here, $\text{offset}_{SF}$ is offset information about a subframe index and has been described in scheme 1-C. Here, $n_s$ may be a slot index in the resource pool of each cell.

A-4: $\lfloor n_s/2 \rfloor$ can be replaced by $\lfloor (n_s + \text{offset}_{slot})/2 \rfloor$ in Equation 8. Here, $\text{offset}_{slot}$ is offset information about a slot index and has been described in scheme 1-C. Here, $n_s$ may be a slot index in the resource pool of each cell.

A-5: In Equation 8, a transmission UE can use $\lfloor n_s/2 \rfloor$ without changing the same and a reception UE can replace $\lfloor n_s/2 \rfloor$ with $\lfloor n_s^{Rx}/2 \rfloor + \text{offset}_{SF}^{neighbor}$ using $n_s^{Rx}$, which is a slot index of the serving cell thereof, and $\text{offset}_{SF}^{neighbor}$, which is subframe index offset information of the cell to which the transmission UE belongs, and perform detection. In this case, cells can notify D2D UEs thereof of $\text{offset}_{SF}^{neighbor}$ of other cells using RRC signaling. Here, $n_s^{Rx}$ may be a slot index in the resource pool of the cell to which the reception UE belongs.

A-6: In Equation 8, a transmission UE can use $\lfloor n_s/2 \rfloor$ without changing the same and a reception unit can replace $\lfloor n_s/2 \rfloor$ with $\lfloor (n_s^{Rx} + \text{offset}_{slot}^{neighbor})/2 \rfloor$ using $n_s^{Rx}$, which is a slot index of the serving cell thereof, and $\text{offset}_{slot}^{neighbor}$, which is slot index offset information of the cell to which the transmission UE belongs, and perform detection. In this case, cells can notify D2D UEs thereof of $\text{offset}_{slot}^{neighbor}$ of other cells using RRC signaling. Here, $n_s^{Rx}$ may be a slot index in the resource pool of the cell to which the reception UE belongs.

That is, rules A-5 and A-6 can be applied on the assumption that cells notify D2D UEs thereof of offset information of other cells using RRC signaling.

A cyclic shift (CS) value of a D2D DMRS can be differently defined according to the first scheme of the present invention. The CS value of the PUSCH DMRS in the current LTE communication system is defined by Equation 9.

$$\alpha_\lambda = 2\pi n_{cs,\lambda}/12 \qquad \text{[Equation 9]}$$

In Equation 9, $n_{cs,\lambda}$ is determined by Equation 10.

$$n_{cs,\lambda} = (n_{DMRS}^{(1)} + n_{DMRS,\lambda}^{(2)} + n_{PN}(n_s)) \bmod 12 \qquad \text{[Equation 10]}$$

In Equation 10, $n_{DMRS}^{(1)}$ is a value indicated through higher layer signaling, $n_{DMRS,\lambda}^{(2)}$ is a value indicated by DCI and $n_{PN}(n_s)$ is determined by Equation 11.

$$n_{PN}(n_s) = \sum_{i=0}^{7} c(8 N_{symb}^{UL} \cdot n_s + i) \cdot 2^i \qquad \text{[Equation 11]}$$

In Equation 11, $c_{init}$ for $c(i)$ is determined by Equation 12.

$$c_{init} = \left\lfloor \frac{N_{ID}^{cell}}{30} \right\rfloor \cdot 2^5 + ((N_{ID}^{cell} + \Delta_{ss}) \bmod 30) \qquad \text{[Equation 12]}$$

In Equation 12, $N_{ID}^{cell}$ is a cell ID and $\Delta_{ss}$ is a value received through a higher layer.

Accordingly, Equation 11 can be modified according to rules B-1 to B-6 described below and used to determine the CS value of the D2D DMRS in the first scheme of the present invention.

B-1: In Equation 11, $n_s$ can be generated on the basis of a subframe index of another cell or a newly generated subframe index (e.g., re-indexed subframe index). Here, $n_s$ may be a slot index in the resource pool of each cell.

B-2: In Equation 11, $n_s$ can be replaced by a slot index of another cell or a newly generated slot index (e.g., re-indexed slot index). Here, $n_s$ may be a slot index in the resource pool of each cell.

B-3: In Equation 11, $n_s$ can be replaced by $n_s + 2 \times \text{offset}_{SF}$. Here, $\text{offset}_{SF}$ is offset information about a subframe index and has been described in scheme 1-C. Here, $n_s$ may be a slot index in the resource pool of each cell.

B-4: In Equation 11, $n_s$ can be replaced by $n_s + \text{offset}_{slot}$. $\text{offset}_{slot}$ is offset information about a slot index and has been described in scheme 1-C. Here, $n_s$ may be a slot index in the resource pool of each cell.

B-5: In Equation 11, a transmission UE can use $n_s$ without changing the same and a reception UE can replace $n_s$ with $n_s^{Rx} + 2 \times \text{offset}_{SF}^{neighbor}$ using $n_s^{Rx}$, which is a slot index of the serving cell thereof, and $\text{offset}_{SF}^{neighbor}$, which is subframe index offset information of the cell to which the transmission UE belongs, and perform detection. In this case, cells can notify D2D UEs thereof of $\text{offset}_{SF}^{neighbor}$ of other cells using RRC signaling. Here, $n_s^{Rx}$ may be a slot index in the resource pool of the cell to which the reception UE belongs.

B-6: In Equation 11, a transmission UE can use $n_s$ without changing the same and a reception UE can replace $n_s$ with $n_s^{Rx} + \text{offset}_{slot}^{neighbor}$ using $n_s^{Rx}$, which is a slot index of the serving cell thereof, and $\text{offset}_{slot}^{neighbor}$, which is slot index offset information of the cell to which the transmission UE belongs, and perform detection. In this case, cells can notify D2D UEs thereof of $\text{offset}_{slot}^{neighbor}$ of other cells through RRC signaling. Here, $n_s^{Rx}$ may be a slot index in the resource pool of the cell to which the reception UE belongs.

That is, rules B-5 and B-6 can be applied on the assumption that cells notify D2D UEs thereof of offset information of other cells using RRC signaling.

A base sequence of the D2D DMRS according to the first scheme of the present invention will now be described in more detail. The Zadoff-Chu sequence for the base sequence of the PUSCH DMRS of the current LTE system is determined by Equation 13.

$$x_q(m) = e^{-j\frac{\pi q m(m+1)}{N_{ZC}^{RS}}}, \quad 0 \leq m \leq N_{ZC}^{RS} - 1 \qquad \text{[Equation 13]}$$

In Equation 13, a root value q is determined by Equation 14.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \qquad \text{[Equation 14]}$$

In Equation 14, u is determined by Equation 15.

[Equation 15]

In Equation 15, $f_{gh}(n_s)$ is determined by Equation 16.

$$f_{gh}(n_s) = \begin{cases} 0 & \text{if group hopping is disabled} \\ \left(\sum_{i=0}^{7} c(8 n_s + i) \cdot 2^i\right) \bmod 30 & \text{if group hopping is enabled} \end{cases} \qquad \text{[Equation 16]}$$

In Equation 16, $c_{init}$ for c(i) is determined by Equation 17.

$$c_{init} = \left\lfloor \frac{n_{ID}^{RS}}{30} \right\rfloor \quad \text{[Equation 17]}$$

In Equation 17, $n_{ID}^{RS}$ is determined by a cell ID or higher layer signaling.

In Equation 15, $f_{ss}$ is determined by Equation 18 in the case of a PUSCH.

$$f_{ss}^{PUSCH} = (N_{ID}^{cell} + \Delta_{ss}) \bmod 30 \quad \text{[Equation 18]}$$

In Equation 18, $N_{ID}^{cell}$ is a cell ID and $\Delta_{ss}$ is a value received through a higher layer.

In Equation 14, V is determined by Equation 19.

$$v = \begin{cases} c(n_s) & \text{if group hopping is disabled and} \\ & \text{sequence hopping is enabled} \\ 0 & \text{otherwise} \end{cases} \quad \text{[Equation 19]}$$

In Equation 19, $c_{init}$ for c(i) is determined by Equation 20.

$$c_{init} = \left\lfloor \frac{n_{ID}^{RS}}{30} \right\rfloor \cdot 2^5 + f_{ss}^{PUSCH} \quad \text{[Equation 20]}$$

In Equation 20, $n_{ID}^{RS}$ is determined by a cell ID or through higher layer signaling and $f_{ss}^{PUSCH}$ is determined by Equation 18.

A description will be given of a method of determining the base sequence of the D2D DMRS by modifying Equation 16 according to rules C-1 to C-6 described below in the first scheme of the present invention.

C-1: In Equation 16, $n_s$ can be generated on the basis of a subframe index of another cell or a newly generated subframe index (e.g., re-indexed subframe index). Here, $n_s$ may be a slot index in the resource pool of each cell.

C-2: In Equation 16, $n_s$ can be replaced by a slot index of another cell or a newly generated slot index (e.g., re-indexed slot index). Here, $n_s$ may be a slot index in the resource pool of each cell.

C-3: In Equation 16, $n_s$ can be replaced by $n_s + 2 \times \text{offset}_{SF}$. Here, $\text{offset}_{SF}$ is offset information about a subframe index and has been described in scheme 1-C. Here, $n_s$ may be a slot index in the resource pool of each cell.

C-4: In Equation 16, $n_s$ can be replaced by $n_s + \text{offset}_{slot}$. Here, $\text{offset}_{slot}$ is offset information about a slot index and has been described in scheme 1-C. Here, $n_s$ may be a slot index in the resource pool of each cell.

C-5: In Equation 16, a transmission UE can use $n_s$ without changing the same and a reception UE can replace $n_s$ with $n_s^{Rx} + 2 \times \text{offset}_{SF}^{neighbor}$ using $n_s^{Rx}$, which is a slot index of the serving cell thereof, and $\text{offset}_{SF}^{neighbor}$, which is subframe index offset information of the cell to which the transmission UE belongs, and perform detection. In this case, cells can notify D2D UEs thereof of $\text{offset}_{SF}^{neighbor}$ of other cells through RRC signaling. Here, $n_s^{Rx}$ may be a slot index in the resource pool of the cell to which the reception UE belongs.

C-6: In Equation 16, a transmission UE can use $n_s$ without changing the same and a reception UE can replace $n_s$ with $n_s^{Rx} + \text{offset}_{slot}^{neighbor}$ using $n_s^{Rx}$, which is a slot index of the serving cell thereof, and $\text{offset}_{slot}^{neighbor}$, which is slot index offset information of the cell to which the transmission UE belongs, and perform detection. In this case, cells can notify D2D UEs thereof of $\text{offset}_{slot}^{neighbor}$ of other cells through RRC signaling. Here, $n_s^{Rx}$ may be a slot index in the resource pool of the cell to which the reception UE belongs.

That is, rules C-5 and C-6 can be applied on the assumption that cells notify D2D UEs thereof of offset information of other cells using RRC signaling.

Second Scheme

According to a second scheme of the present invention, the present invention may be adaptively applied according to a subframe index and timing related to the start point of the resource pool of each cell.

In current D2D communication, communication is performed based on resource pools, as described above. However, there is a possibility that subframe (or slot) indices are newly defined in the resource pool of each cell. For example, even when an uplink subframe (or slot) index is not 0, the start point of the resource pool of each D2D cell can be set to subframe (or slot) index 0. Otherwise, the start point of the resource pool of each cell may be set to a value that is not subframe (or slot) index 0 or the uplink subframe (slot) index. Accordingly, one of following schemes 2-A to 2-D can be applied.

Scheme 2-A: Subframes (or slots) of cells may be started from the same index at the start points of resource pools of the cells and the start points of the resource pools of the cells may have the same timing.

In this case, transmission UEs can use subframe (or slot) indices defined in the resource pools of the cells to generate a scrambling sequence and a DMRS for D2D and reception UEs can use subframe (or slot) indices defined in the resource pools of the cells to decode the scrambling sequence and DMRS for D2D.

Scheme 2-B: Subframes (or slots) of cells may be started from the same index at the start points of resource pools of the cells and the start points of the resource pools of the cells may have different timings. In this case, the following schemes 2-B-1 and 2-B-2 can be considered.

Scheme 2-B-1: When a D2DSS is transmitted at a fixed timing in the resource pool of each cell, the D2DSS transmission timing can be defined as a subframe (or slot) index (subframe (or slot) indices after the D2DSS transmission timing are sequentially determined on the basis of the index defined according to the D2DSS transmission timing). Here, since the D2DSS transmission timing is different for each cell, transmission/reception UEs can be notified of an offset between D2DSS transmission timings (or an offset between start points of resource pools of cells) using the subframe-based offset information described in scheme 1-C through RRC signaling. Accordingly, embodiments of the present invention using the offset information can conform to rules A-3, A-4, A-5, A-6, B-3, B-4, B-5, B-6, C-3, C-4, C-5 and C-6.

Scheme 2-B-2: As described above in scheme 1-C, transmission/reception UEs can be notified of subframe offset information (or slot index offset information) about the start points of resource pools of a reference cell and a cell, which will be used for a scrambling sequence and a DMRS, using RRC signaling. Accordingly, embodiments of the present invention using the offset information can conform to rules A-3, A-4, A-5, A-6, B-3, B-4, B-5, B-6, C-3, C-4, C-5 and C-6.

Scheme 2-C: Subframes (or slots) of cells may be started from different indices at the start points of resource pools of the cells and the start points of the resource pools of the cells may have different timings. In this case, the following schemes 2-C-1 and 2-C-2 can be considered.

Scheme 2-C-1: When a D2DSS is transmitted at a fixed timing in the resource pool of each cell, the D2DSS transmission timing can be defined as a subframe (or slot) index (subframe (or slot) indices after the D2DSS transmission timing are sequentially determined on the basis of the index defined according to the D2DSS transmission timing). Here, since the D2DSS transmission timing is different for each cell, transmission/reception UEs can be notified of an offset between D2DSS transmission timings (or an offset between start points of resource pools of cells) using the subframe-based offset information described in scheme 1-C through RRC signaling. In addition, the transmission/reception UEs need to be notified of a subframe (or slot) index corresponding to the start point of a resource pool of a reference cell. In specific examples of the invention using the offset information and the subframe (or slot) index of the start point of the resource pool of the reference cell, rules A-3, A-4, A-5, A-6, B-3, B-4, B-5, B-6, C-3, C-4, C-5 and C-6 can be modified into rules A'-3, A'-4, A'-5, A'-6, B'-3, B'-4, B'-5, B'-6, C'-3, C'-4, C'-5 and C'-6 and applied, respectively.

A'-3: In Equation 8, $\lfloor n_s/2 \rfloor$ can be replaced by $\lfloor n_s/2 \rfloor + \text{offset}_{SF} + n_{SF}^{Ref}$. Here, $\text{offset}_{SF}$ is offset information representing a D2DSS transmission timing different for each cell as a subframe index (or offset information between the start points of resource pools of cells). $n_{SF}^{Ref}$ is the subframe index of the start point of the resource pool of the reference cell. Here, $n_s$ may be a slot index in the resource pool of each cell.

A'-4: In Equation 8, $\lfloor n_s/2 \rfloor$ can be replaced by $\lfloor (n_s + \text{offset}_{slot} + n_s^{Ref})/2 \rfloor$. Here, $\text{offset}_{slot}$ is offset information representing a D2DSS transmission timing different for each cell as a slot index (or offset information between start points of resource pools of cells). $n_s^{Ref}$ is the slot index of the start point of the resource pool of the reference cell. Here, $n_s$ may be a slot index in the resource pool of each cell.

A'-5: In Equation 8, a transmission UE can use $\lfloor n_s/2 \rfloor$ without changing the same and a reception UE can replace $\lfloor n_s/2 \rfloor$ with $\lfloor n_s^{Rx}/2 \rfloor + \text{offset}_{SF}^{neighbor} + n_{SF}^{neighbor}$ using $n_s^{Rx}$, which is a slot index of the resource pool of the serving cell thereof, and $\text{offset}_{SF}^{neighbor}$ and $n_{SF}^{neighbor}$, which are subframe index offset information of the cell to which the transmission UE belongs, and perform detection. $n_{SF}^{neighbor}$ is the subframe index of the start point of the resource pool of the cell to which the transmission UE belongs. In this case, cells can notify D2D UEs thereof of $\text{offset}_{SF}^{neighbor}$ and $n_{SF}^{neighbor}$ using RRC signaling. Here, $n_s^{Rx}$ may be a slot index in the resource pool of the cell to which the reception UE belongs.

A'-6: In Equation 8, a transmission UE can use $\lfloor n_s/2 \rfloor$ without changing the same and a reception UE can replace $\lfloor n_s/2 \rfloor$ with $\lfloor (n_s^{Rx} + \text{offset}_{slot}^{neighbor} + n_{slot}^{neighbor})/2 \rfloor$ using $n_s^{Rx}$, which is a slot index of the resource pool of the serving cell thereof, and $\text{offset}_{slot}^{neighbor}$ and $n_{slot}^{neighbor}$, which are slot index offset information of the cell to which the transmission UE belongs, and perform detection. $n_{slot}^{neighbor}$ is the slot index of the start point of the resource pool of the cell to which transmission UE belongs. In this case, cells can notify D2D UEs thereof of $\text{offset}_{slot}^{neighbor}$ and $n_{slot}^{neighbor}$ of other cells using RRC signaling. Here, $n_s^{Rx}$ may be a slot index in the resource pool of the cell to which the reception UE belongs.

B'-3: In Equation 11, $n_s$ can be replaced by $n_s + 2\times\text{offset}_{SF} + 2\times n_{SF}^{Ref}$. Here, $\text{offset}_{SF}$ is offset information representing a D2DSS transmission timing different for each cell as a subframe index (or offset information between start points of resource pools of cells). $n_{SF}^{Ref}$ is the subframe index of the start point of the resource pool of the reference cell. Here, $n_s$ may be a slot index in the resource pool of each cell.

B'-4: In Equation 11, $n_s$ can be replaced by $n_s + \text{offset}_{slot} + n_s^{Ref}$. Here, $\text{offset}_{slot}$ is offset information representing a D2DSS transmission timing different for each cell as a slot index (or offset information between start points of resource pools of cells). $n_s^{Ref}$ is the slot index of the start point of the resource pool of the reference cell. Here, $n_s$ may be a slot index in the resource pool of each cell.

B'-5: In Equation 11, a transmission UE can use $n_s$ without changing the same and a reception UE can replace $n_s$ with $n_s^{Rx} + 2\times\text{offset}_{SF}^{neighbor} + 2\times n_{SF}^{neighbor}$ using $n_s^{Rx}$, which is a slot index of the resource pool of the serving cell thereof, and $\text{offset}_{SF}^{neighbor}$ and $n_{SF}^{neighbor}$, which are subframe index offset information of the cell to which the transmission UE belongs, and perform detection. $n_{SF}^{neighbor}$ is the subframe index of the start point of the resource pool of the cell to which the transmission UE belongs. In this case, cells can notify D2D UEs thereof of $\text{offset}_{SF}^{neighbor}$ and $n_{SF}^{neighbor}$ using RRC signaling. Here, $n_s^{Rx}$ may be a slot index in the resource pool of the cell to which the reception UE belongs.

B'-6: In Equation 11, a transmission UE can use $n_s$ without changing the same and a reception UE can replace $n_s$ with $n_s^{Rx} + \text{offset}_{slot}^{neighbor}$ using $n_s^{Rx}$, which is a slot index of the resource pool of the serving cell thereof, and $\text{offset}_{slot}^{neighbor}$ and $n_{slot}^{neighbor}$, which are slot index offset information of the cell to which the transmission UE belongs, and perform detection. $n_{slot}^{neighbor}$ is the slot index of the start point of the resource pool of the cell to which transmission UE belongs. In this case, cells can notify D2D UEs thereof of $\text{offset}_{slot}^{neighbor}$ and $n_{slot}^{neighbor}$ of other cells using RRC signaling. Here, $n_s^{Rx}$ may be a slot index in the resource pool of the cell to which the reception UE belongs.

C'-3: In Equation 16, $n_s$ can be replaced by $n_s + 2\times\text{offset}_{SF} + 2\times n_{SF}^{Ref}$. Here, $\text{offset}_{SF}$ is offset information representing a D2DSS transmission timing different for each cell as a subframe index (or offset information between start points of resource pools of cells). $n_{SF}^{Ref}$ is the subframe index of the start point of the resource pool of the reference cell. Here, $n_s$ may be a slot index in the resource pool of each cell.

C'-4: In Equation 16, $n_s$ can be replaced by $n_s + \text{offset}_{slot} + n_s^{Ref}$. Here, $\text{offset}_{slot}$ is offset information representing a D2DSS transmission timing different for each cell as a slot index (or offset information between start points of resource pools of cells). $n_s^{Ref}$ is the slot index of the start point of the resource pool of the reference cell. Here, $n_s$ may be a slot index in the resource pool of each cell.

C'-5: In Equation 16, a transmission UE can use $n_s$ without changing the same and a reception UE can replace $n_s$ with $n_s^{Rx} + 2\times\text{offset}_{SF}^{neighbor} + 2\times n_{SF}^{neighbor}$ using $n_s^{Rx}$, which is a slot index of the resource pool of the serving cell thereof, and $\text{offset}_{SF}^{neighbor}$ and $n_{SF}^{neighbor}$, which are subframe index offset information of the cell to which the transmission UE belongs, and perform detection. $n_{SF}^{neighbor}$ is the subframe index of the start point of the resource pool of the cell to which the transmission UE belongs. In this case, cells can notify D2D UEs thereof of $\text{offset}_{SF}^{neighbor}$ and $n_{SF}^{neighbor}$ using RRC signaling. Here, $n_s^{Rx}$ may be a slot index in the resource pool of the cell to which the reception UE belongs.

C'-6: In Equation 16, a transmission UE can use $n_s$ without changing the same and a reception UE can replace $n_s$ with $n_s^{Rx} + \text{offset}_{slot}^{neighbor} + n_{slot}^{neighbor}$ using $n_s^{Rx}$, which is a slot index of the resource pool of the serving cell thereof, and $\text{offset}_{slot}^{neighbor}$ and $n_{slot}^{neighbor}$, which are slot index offset information of the cell to which the transmission UE belongs, and perform detection. $n_{slot}^{neighbor}$ the slot index of the start point of the resource pool of the cell to which transmission UE belongs. In this case, cells can notify D2D UEs thereof of offset$_{slot}^{neighbor}$ and n$_{slot}^{neighbor}$ of other cells using RRC signaling. Here, n$_s^{Rx}$ may be a slot index in the resource pool of the cell to which the reception UE belongs.

Scheme 2-C-2: As described above in scheme 1-C, transmission/reception UEs can be notified of offset information corresponding to the sum of a subframe (or slot) offset with respect to subframe (slot) indices corresponding to the start points of resource pools of a reference cell and a corresponding cell and a subframe (or slot) offset with respect to the start points of resource pools of cells, which will be used for a scrambling sequence and a DMRS, using RRC signaling. Accordingly, embodiments of the present invention using the offset information can conform to rules A-3, A-4, A-5, A-6, B-3, B-4, B-5, B-6, C-3, C-4, C-5 and C-6.

Scheme 2-D: Subframes (or slots) of cells may be started from different indices at the start points of resource pools of the cells and the start points of the resource pools of the cells may have different timings. In this case, as described above in scheme 1-C, transmission/reception UEs can be notified of offset information about subframe (or slot) indices corresponding to the start points of resource pools of a reference cell and a cell, which will be used for a scrambling sequence and a DMRS, using RRC signaling. Accordingly, embodiments of the present invention using the offset information can conform to rules A-3, A-4, A-5, A-6, B-3, B-4, B-5, B-6, C-3, C-4, C-5 and C-6.

Third Scheme

In the present invention, if a D2DSS is periodically transmitted in all reception resource pools, a D2DSS transmission timing can be defined as a certain subframe (or slot) index value. (Subframe (or slot) indices after the D2DSS transmission timing are sequentially determined on the basis of the index value defined according to the D2DSS transmission timing.)

A transmission UE can generate a scrambling sequence and a DMRS for D2D using the defined subframe (or slot) index value. Reception UEs decode the scrambling sequence and the DMRS for D2D using the subframe (or slot) index value defined at the D2DSS transmission timing. Specific examples of the invention can conform to rules A-1, A-2, B-1, B-2, C-1 or C-2.

Fourth Scheme

According to a fourth scheme of the present invention, when a scrambling sequence and a DMRS used for D2D communication are generated, a subframe (or slot) index can be replaced by a function of an SA ID ((i) ID of a reception UE or (ii) ID of a reception UE group in D2D communication). In this case, D2D communication can be performed between a transmission UE and a reception UE which are not synchronized without additionally signaling a subframe index between cells. Therefore, according to the fourth scheme, rules D-1 to D-8 can be applied.

D-1: $\lfloor n_s/2 \rfloor$ can be replaced by an SA ID in Equation 8 in order to generate a scrambling sequence in D2D communication.

D-2: $\lfloor n_s/2 \rfloor$ can be replaced by (SA ID mod 10) using an SA ID in Equation 8 in order to generate a scrambling sequence in D2D communication.

D-3: $n_s$ can be replaced by an SA ID in Equation 8 in order to generate a scrambling sequence in D2D communication.

D-4: $n_s$ can be replaced by (SA ID mod 20) using an SA ID in Equation 8 in order to generate a scrambling sequence in D2D communication.

D-5: $n_s$ can be replaced by an SA ID in Equation 11 in order to generate a DMRS CS value in D2D communication.

D-6: $n_s$ can be replaced by (SA ID mod 20) using an SA ID in Equation 11 in order to generate a DMRS CS value in D2D communication.

D-7: $n_s$ can be replaced by an SA ID in Equation 16 in order to generate a base sequence of a DMRS in D2D communication.

D-8: $n_s$ can be replaced by (SA ID mod 20) using an SA ID in Equation 16 in order to generate a base sequence of a DMRS in D2D communication.

Fifth Scheme

In D2D communication, a reception UE is out of coverage and thus may have difficulty knowing a slot number. In this case, since a subframe (or slot) number is used in generation of a DMRS and a scrambling sequence in the current LTE system, the reception UE may not perform communication because the reception UE does not know a slot number used for generation of a DMRS and a scrambling sequence. To solve this problem, a subframe (or slot) index can be replaced by an SA related value when a scrambling sequence and a DMRS used for D2D communication are generated in the fifth scheme of the present invention.

Accordingly, a subframe (or slot) offset in the SA resource pool can be defined as a subframe (or slot) index value. This subframe (or slot) index value is defined as offset$_{SA\ SF1}$ (or offset$_{SA\ slot1}$). In this case, even a UE out of coverage can be aware of a subframe (or slot) index used for the DMRS and the scrambling sequence if the UE knows information about resource pools.

However, a D2D signal and an uplink signal may be mixed without separate resource pools and subframes corresponding to the SA resource pool may not be defined. Accordingly, a subframe offset from the first subframe from among subframes in which SA is transmitted can be defined as a subframe index value. This subframe index value can be defined as offset$_{SA\ SF2}$. Otherwise, a slot offset from the first slot from among slots in which SA is transmitted can be defined as a slot index value. This slot index value can be defined as offset$_{SA\ slot2}$. Therefore, according to the fifth scheme, rules E-1 to E-8 can be applied.

E-1: $\lfloor n_s/2 \rfloor$ can be replaced by offset$_{SA\ SF1}$ (or offset$_{SA\ SF2}$) in Equation 8 in order to generate a scrambling sequence in D2D communication.

E-2: $\lfloor n_s/2 \rfloor$ can be replaced by (offset$_{SA\ SF1}$ mod 10) or (offset$_{SA\ SF2}$ mod 10) using an SA ID in Equation 8 in order to generate a scrambling sequence in D2D communication.

E-3: $n_s$ can be replaced by offset$_{SA\ slot1}$ (or offset$_{SA\ slot2}$) in Equation 8 in order to generate a scrambling sequence in D2D communication.

E-4: $n_s$ can be replaced by (offset$_{SA\ slot1}$ mod 20) or (offset$_{SA\ slot2}$ mod 20) using an SA ID in Equation 8 in order to generate a scrambling sequence in D2D communication.

E-5: $n_s$ can be replaced by offset$_{SA\ SF1}$ (or offset$_{SA\ SF2}$) in Equation 11 in order to generate a DMRS CS value in D2D communication.

E-6: $n_s$ can be replaced by (offset$_{SA\ SF1}$ mod 10) or (offset$_{SA\ SF2}$ mod 10) using an SA ID in Equation 11 in order to generate a DMRS CS value in D2D communication.

E-7: $n_s$ can be replaced by offset$_{SA\ slot1}$ (or offset$_{SA\ slot2}$) in Equation 16 in order generate a base sequence of a DMRS in D2D communication.

E-8: $n_s$ can be replaced by (mod 20) or (offset$_{SA\ slot2}$ mod 20) using an SA ID in Equation 16 in order to generate offset$_{SA\ slot1}$ a base sequence of a DMRS in D2D communication.

Sixth Scheme

According to a sixth scheme of the present invention, a subframe (or slot) number in a resource pattern type in a data resource pool can be defined as a subframe (or slot) index value. This subframe (or slot) index is defined as offset$_{SA\_SF1}$ (or offset$_{SA\_slot1}$). A transmission UE can generate a scrambling sequence and a DMRS for D2D using the defined subframe (or slot) index value. For example, if data has a resource pattern type transmitted in subframes 1, 3, 5 and 7, these subframes 1, 3, 5 and 7 can be defined as subframes 0, 1, 2 and 3 and the scrambling sequence and DMRS for D2D can be generated. According to the sixth scheme of the present invention, rules F-1 to F-8 can be applied.

F-1: $\lfloor n_s/2 \rfloor$ can be replaced by offset$_{SA\_SF1}$ in Equation 8 in order to generate a scrambling sequence in D2D communication.

F-2: $\lfloor n_s/2 \rfloor$ can be replaced by (offset$_{SA\_SF1}$ mod 10) using an SA ID in Equation 8 in order to generate a scrambling sequence in D2D communication.

F-3: $n_s$ can be replaced by offset$_{SA\_slot1}$ in Equation 8 in order to generate a scrambling sequence in D2D communication.

F-4: $n_s$ can be replaced by (offset$_{SA\_slot1}$ mod 20) using an SA ID in Equation 8 in order to generate a scrambling sequence in D2D communication.

F-5: $n_s$ can be replaced by offset$_{SA\_SF1}$ in Equation 11 in order to generate a DMRS CS value in D2D communication.

F-6: $n_s$ can be replaced by (offset$_{SA\_SF1}$ mod 10) using an SA ID in Equation 11 in order to generate a DMRS CS value in D2D communication.

F-7: $n_s$ can be replaced by offset$_{SA\_slot1}$ in Equation 16 in order to generate a base sequence of a DMRS in D2D communication.

F-8: $n_s$ can be replaced by (offset$_{SA\_slot1}$ mod 20) using an SA ID in Equation 16 in order to generate a base sequence of a DMRS in D2D communication.

In the first to sixth schemes described above, the offset information offset$_{SF}$, offset$_{slot}$, offset$_{SF}^{neighbor}$ and offset$_{slot}^{neighbor}$ and the subframe or slot indices $n_{SF}^{Ref}$, $n_{slot}^{Ref}$, $n_{SF}^{neighbor}$ and $n_{slot}^{neighbor}$ at the start points of resource pools of cells may be indicated as specific values per frequency band for a UE performing D2D communication or per frequency band for a UE group performing D2D communication using RRC signaling.

In addition, in the first to sixth schemes described above, the offset information offset$_{SF}$, offset$_{slot}$, offset$_{SF}^{neighbor}$ and offset$_{slot}^{neighbor}$ and the subframe or slot indices $n_{SF}^{Ref}$, $n_{slot}^{Ref}$, $n_{SF}^{neighbor}$ and $n_{slot}^{neighbor}$ at the start points of resource pools of cells may be indicated per cell or cell group using RRC signaling.

Figure 12:
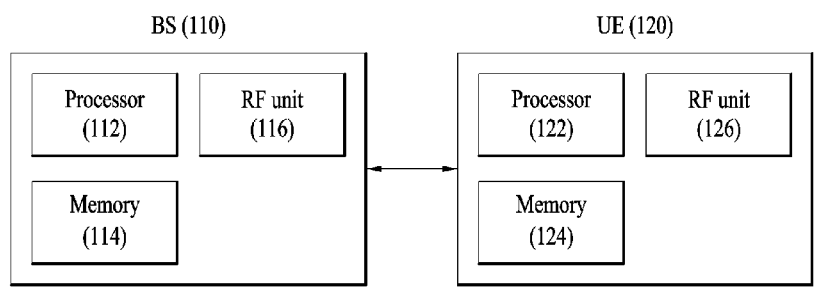
FIG. 12 illustrates a BS and a UE applicable to an embodiment of the present invention.

FIG. 12 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 12, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the method of transmitting a signal for D2D communication in a wireless communication system and the apparatus therefor are applied to 3GPP LTE have been described, the present invention is applicable to various wireless communication systems in addition to 3GPP LTE.

What is claimed is:

1. A method of transmitting a signal of a first user equipment (UE) in a wireless communication system, comprising:
   receiving a resource pool configuration for a D2D (device-to-device) data channel; and
   determining a resource pool for the D2D data channel based on the resource pool configuration; and
   transmitting the D2D data channel based on the resource pool for the D2D data channel and transmitting demodulation reference signal (DMRS) related to the D2D data channel,
   wherein the DMRS is generated based on a slot number which is relatively re-indexed within the resource pool for the D2D data channel.

2. The method according to claim 1, wherein the D2D data channel has been scrambled using a scrambling sequence generated based on the re-indexed slot number.

3. The method according to claim 1, wherein the D2D data channel has been scrambled using a scrambling sequence generated based on a slot number re-indexed according to only uplink subframes within the resource pool for the D2D data channel.

4. The method according to claim 1, wherein the slot number is re-indexed using a modulo operation.

5. The method according to claim 1, wherein the first UE and a second UE are respectively synchronized with different serving cells.

6. The method according to claim 5, further comprising receiving, from a first serving cell with which the first UE is synchronized, slot index offset information of the first serving cell and a second serving cell with which the second UE is synchronized.

7. The method according to claim 1, wherein when the first UE receives a subframe number for a neighboring cell, the first UE generates the DMRS based on an offset value between a subframe number for a synchronized serving cell and the subframe number for the neighboring cell.

8. The method according to claim 1,
   wherein the resource pool includes a scheduling assignment resource pool and a D2D data channel resource pool, and
   wherein the scheduling assignment resource pool is configured to precede the D2D data channel resource pool.

9. A first user equipment (UE) transmitting a signal in a wireless communication system, comprising:
   a radio frequency unit; and
   a processor,
   wherein the processor is configured to:
   receive a resource pool configuration for a D2D (device-to-device) data channel,
   determine a resource pool for the D2D data channel based on the resource pool configuration, and
   transmit the D2D data channel based on the resource pool for the D2D data channel and transmit a demodulation reference signal (DMRS) related to the D2D data channel,
   wherein the DMRS is generated based on a slot number which is relatively re-indexed within the resource pool for the D2D data channel.

10. The UE of claim 9, wherein the D2D data channel has been scrambled using a scrambling sequence generated based on the re-indexed slot number.

11. The UE of claim 9, wherein when the first UE receives a subframe number for a neighboring cell, the first UE generates the DMRS based on an offset value between a subframe number for a synchronized serving cell and the subframe number for the neighboring cell.

12. The UE of claim 9, wherein the D2D data channel has been scrambled using a scrambling sequence generated based on the slot number re-indexed according to only uplink subframes within the resource pool.

13. The method according to claim 1, wherein the re-indexed slot number is different from a slot number for an uplink subframe.

14. The UE of claim 9, wherein the re-indexed slot number is different from a slot number for an uplink subframe.

* * * * *